United States Patent Office 2,923,340
Patented Feb. 2, 1960

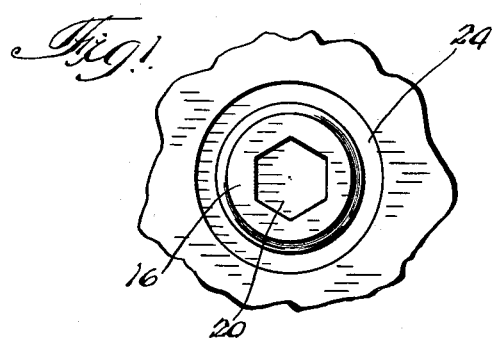
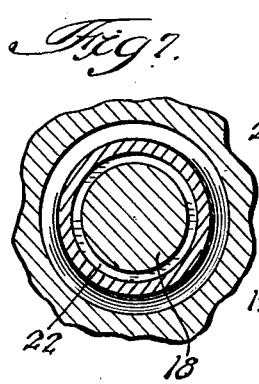
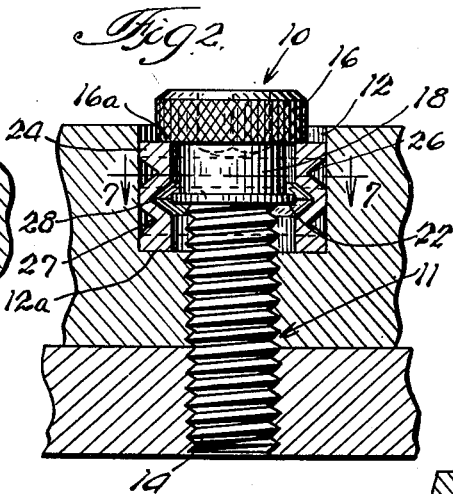
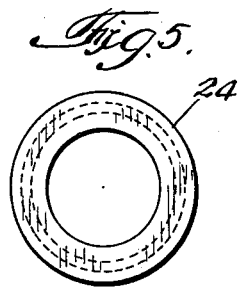
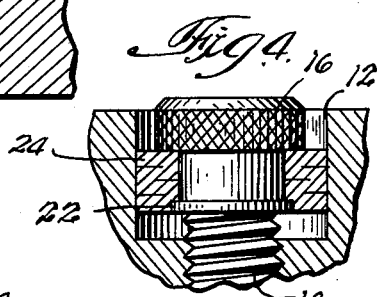
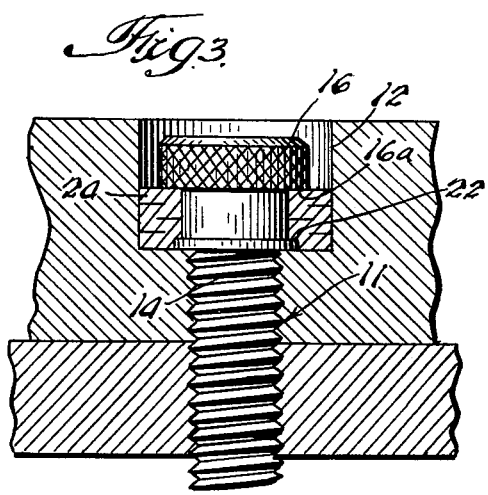
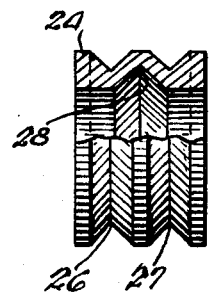

2,923,340

THREADED FASTENER MEANS INCLUDING MALLEABLE WITHDRAWABLE LOCK WASHER

De Wayne M. Williams, Chicago, Ill., assignor to Safety Socket Screw Company, a partnership consisting of Clarence W. Payne, De Wayne M. Williams, and the estate of Albert E. Overton, deceased Application September 10, 1957, Serial No. 683,047

4 Claims. (Cl. 151—44)

This invention relates to threaded fasteners, and more particularly to a screw having a novel configuration and the combination of that screw with a novelly constructed expandable type lock washer.

In screw fastenings of previous design which have been used in threadably tapped holes having concentric cylindrical counterbores, two problems of considerable consequence have been presented. Quite often such fasteners are used on machines or equipment which are subjected to vibrative movement of such magnitude and duration that the screws or bolts have a tendency to loosen. This condition is, of course, highly undesirable from the standpoint of both maintenance and quality, for such machines are generally expected to provide long periods of continuous trouble-free operation.

Various attempts have been made to lock such screw fasteners in place, but most have ended in failure, particularly where the vibrations, to which the fastener was subjected, were quite severe. Also quite frequently the fastener is required to act as a seal against oil, water, gas, air, or the like. Various seals have been developed which have been satisfactory for most purposes; however where the fastener is subjected to vibration, these seals either work loose themselves, or are loosened as a consequence of the loosening of the screw.

Again, in certain instances it is desirable and necessary that the screws be removed either for disassembling a portion of the equipment or for complete cleaning of the equipment. In these instances it quite often is necessary also to remove the lock washer so that it may be thoroughly cleaned and reused. This is particularly true where foodstuffs are being handled and where cleanliness is an important consideration.

Thus for quite some time the need has existed for a lock washer capable of maintaining the tightness of the screw even under conditions of excessive vibration, and adapted to serve as an effective seal against fluids, and for a screw which permits the lock washer to be easily removed from its counterbore when the screw is removed from its threadably tapped hole.

It is therefore one particular object of this invention to provide a fastening device which is completely dependable for maintaining the fastener or screw in the proper position after it has been tightened.

It is another object of this invention to provide a screw fastener for use in connection with a threadably tapped hole having a concentric cylindrical counterbore, which screw fastener may be easily locked in place, will remain in place even under subjection to very high magnitudes of vibration and will provide an effective seal against fluids.

It is still another object of this invention to provide a screw fastener employing an improved lock washer of malleable material and having a configuration which facilitates the desired deformation thereof.

It is a further object of this invention to provide a very efficient reliable and inexpensive fastener which employs a malleable expandable lock washer and which by a novel cooperating screw configuration permits this lock washer to be removed from its counterbore when the screw is removed from its threadably tapped hole.

Other objects will be seen and a fuller understanding of the invention may be had by referring to the following description and claims taken in conjunction with the accompanying drawings.

In accordance with one embodiment of this invention a fastener is provided for use with a threadably tapped hole having a concentric cylindrical counterbore. The fastener includes a screw and a malleable lock washer. The lock washer is of sinuous axial cross section and is capable of axial compression and radial broadening in response to axial pressure such as applied by said screw within the cylindrical counterbore. The screw has a threaded portion, a head portion and a shank portion intermediate said threaded portion and said head portion. The screw shank portion is recessed relative to the head portion and has a radial projection extending outwardly therefrom. This projection, which is preferably cylindrical and resembles a shoulder, is adapted to firmly engage the lock washer after it has been compressed axially and broadened radially, and subsequent axial movement of the screw, such as removal thereof from the threadably tapped hole, will result in corresponding axial movement of the lock washer and its removal from the concentric cylindrical counterbore.

In the drawings:

Fig. 1 is a top plan view of the fastener constructed in accordance with this invention;

Fig. 2 is a cross sectional view of the fastener showing the lock washer in the uncompressed condition;

Fig. 3 is a cross sectional view showing the screw in its fully tightened position and the lock washer in its fully compressed condition;

Fig. 4 is a sectional elevation showing the compressed lock washer partially removed from the cylindrical counterbore as effected by partial removal of the screw from the threadably tapped hole;

Fig. 5 is a top plan view of the washer which is used to lock the screw in place;

Fig. 6 is a side view of the lock washer; and

Fig. 7 is a sectional view taken substantially along line 7—7 of Fig. 2.

With more particular reference to the drawings, a screw 10 is provided which is adapted to be used in connection with a threadably tapped hole 11 having a concentric counterbore 12. Counterbore 12 has a cylindrical shoulder-like bottom 12a circumjacent the upper end of hole 11. Screw 10 includes a threaded portion 14, a cylindrical head portion 16 and a shank portion 18 disposed intermediate head portion 16 and threaded portion 14. A hexagonal recess 20 is provided in head portion 16 of the screw and is adapted to receive a hexagonal driving implement such as a hexagon key. The exterior cylindrical surface of head portion 16 is preferably knurled such that the screw may be easily positioned and rotated by hand if such is desired. Shank portion 18 of the screw is also cylindrical and of smaller diameter than head portion 16. A shoulder 16a is formed at the point where head portion 16 and shank portion 18 join. Adjacent threaded portion 14 on shank 18 a cylindrical shoulder-like projection 22 is provided. Projection 22 extends radially outward from shank portion 18 and is of a larger diameter than either the shank or threaded portion of the screw, but is of smaller diameter than the head portion 16. This cylindrical projection 22 provides a very novel and useful function as will be seen.

A cylindrical lock washer 24 is sleeve-like in formation and has a series of annular grooves 26, 27 and 28. Two of these annular grooves 26 and 27 are formed in the outer surface of the lock washer and a single groove 28 is formed in the inner surface of the washer. As shown in Figs. 2 and 6, the three grooves of the lock washer are spaced axially apart such that the lock washer exhibits a pleated or sinuous cross section. It is preferred that the thickness of the lock washer over most of its axial length be substantially constant.

Lock washer 24 is preferably formed with its outer diameter slightly smaller than the diameter of counterbore 12, and its inner diameter slightly larger than the diameter of projection 22 of the screw.

It may thus be seen that the lock washer 24 may be slipped into the recess or counterbore 12 before the screw 10 is inserted. The screw may then be inserted and threaded in tapped hole 11 until the shoulder 16a of head portion 16 abuts the upper surface of the lock washer. The knurled surface of the screw head permits this to be done by hand very easily. The close fit of the lock washer in the counterbore assures concentricity of the washer with respect to both the counterbore and the screw. Further tightening of the screw 10 by means of a hexagon key compresses the lock washer 24 between the shoulder 16a of the screw head and the bottom 12a of the counterbore and thus the lock washer is caused to collapse in a predictable, uniform and very useful manner. This collapse of the lock washer with resultant increase in diameter of the outside of the washer and decrease in the inside diameter of the washer, is greatly facilitated by the washer's pleated or sinuous cross section.

In Figs. 2 and 6 the lock washer is shown in the uncompressed condition, whereas in Fig. 3 the lock washer is shown in the completely compressed or collapsed condition. In effect, the pleats of the lock washer are squeezed together such that they expand radially. Thus the portion of the lock washer intermediate the two spaced grooves 26 and 27 tends to buckle outwardly ahead of the relatively thick ring-like portions at either end of the lock washer. Also the portions of the interior surface of the lock washer on either side of groove 28 are buckled radially inward such that they forcibly engage the shank intermediate shoulder 16a and shoulder-like projection 22. The screw 10 may be tightened until the grooves 26, 27 and 28 are completely closed, that is, until the walls forming the grooves are brought into contact with each other such as shown in Fig. 3. The lock washer should therefore be formed of a malleable material so that it can be collapsed without excessive torque having to be applied to the screw. Bronze is preferred, although satisfactory results have been achieved with lead.

As shown in Fig. 3, when the washer is completely compressed or collapsed, the exterior portions of the washer are tightly engaged against the interior surfaces of the counterbore 12 and the interior surfaces of the washer are bound tightly in engagement against the cylindrical shank portion 18 of the screw. The lock washer material has filled out the counterbore circumjacent the shank portion 18 of the screw, and thus subsequent accidental loosening of the screw such as would occur under vibration is prevented and a very tight leak-proof seal is effected.

It is preferred that the screw and lock washer is so designed that the shank portion 18 of the screw is approximately equal in length to that of the compressed lock washer. Thus constructed, the shoulder 22 which extends radially outward from shank portion 18 adjacent threaded portion 14 of the screw, firmly engages and in fact is imbedded in the compressed lock washer. The lock washer in most instances is compressed very tightly against the shank 18, such that the lock washer and shank become for all practical purposes integral.

It will be noted that most of the lock washer material lies above the shoulder 22 when the lock washer is compressed. This permits the compressed washer 24 to be pushed upwardly in the counterbore when the screw is threadably removed from its tapped hole.

In Fig. 4 the screw and lock washer are shown in the partially withdrawn position. It may be seen that the lock washer has moved axially upward in the counterbore a distance corresponding to the distance which the screw has been threadably removed from tapped hole 11. The screw and lock washer thus may be removed from the hole 11 and counterbore 12 and may be used over again. If the material used in the washer is sufficiently resilient, the loosening of bolt 10 by a hexagon key will permit a slight axial expansion of the lock washer and thus, when the screw and lock washer are subsequently reinserted in the threadably tapped hole and counterbore, the sealing and locking action of these members is assured by the slight compression of the lock washer which is required to again fully collapse it.

It will be understood that as the screw is tightened in the threadably tapped hole to effect collapse of the previously uncompressed lock washer, the torque is carried by both the threads and head portions of the screw. The head and shank portions of the screw are held tightly after the washer has been collapsed and the holding action of the washer is not dependent upon the pitch line of the threads to hold the entire load.

The device may be modified in a number of ways without departing from the scope of the invention. As a practical matter the insert or sleeve-like lock washer may be grooved in any fashion which will effect weakening of the walls such that the material when compressed will follow the line of least resistance and the collapsed structure will fill the counterbore circumjacent the shank portion of the screw. The grooves may be placed inside or outside of the washer and the washer may be fabricated from a variety of metals and plastics. It has been found that bronze is a particularly good material from which to fabricate such washers, particularly when the fastener is expected to contact food or be subjected to elevated temperatures.

It may be seen that a fastener has been provided which utilizes a very novel configuration of screw and a very novelly constructed expandable type lock washer which when used in combination effect a very dependable and tight seal, and which prevents the fastener from being accidentally loosened by vibration. The screw is so constructed that it will effect removal of the lock washer from the counterbore of the hole in which the screw is threaded, and thus the screw and washer may be used again with dependable results.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. For use with a threadably tapped hole having a concentric cylindrical counterbore, the combination of a screw and a malleable lock washer, said screw having a threaded portion, an annular head portion, and an annular shank portion intermediate said threaded portion and said head portion, said shank portion being of uniform thickness and having a diameter which is at least as great as the diameter of said threaded portion and which is smaller than the diameter of said head portion, an annular shoulder-like projection extending radially outward from said shank portion adjacent said threaded portion, said lock washer being of sinuous axial cross section and being capable of axial compression and radial broadening in response to axial pressure to substantially fill the counterbore circumjacent said screw shank portion, the smallest inside diameter of said washer uncompressed being of greater magnitude than the largest diameter of said annular projection and being of smaller magnitude than the diameter of said head portion, said annular shoulder-like projection on said screw being adapted to engage the compressed lock washer to effect removal of said washer from the counterbore when said screw is removed from the threadably tapped hole.

2. For use with a threadably tapped hole having a concentric cylindrical counterbore the combination of a screw and a sleeve-like malleable lock washer, said screw having a threaded portion, a cylindrical head portion and a cylindrical shank portion intermediate said threaded portion and said head portion, said shank portion having a diameter which is at least as great as the diameter of said threaded portion and which is uniformly smaller than the diameter of said head portion, a cylindrical projection extending radially outward from said shank portion adjacent said threaded portion, said washer having two annular axially spaced grooves in one cylindrical surface thereof and a third annular groove axially intermediate said two grooves in the other cylindrical surface thereof, the smallest inside diameter of said washer being of greater magnitude than the diameter of said cylindrical projection and being of smaller magnitude than the diameter of said head portion, said lock washer adapted to expand to fill the space within the counterbore circumjacent said screw shank portion intermediate said cylindrical shoulder and said cylindrical head portion, whereby said screw is locked against subsequent turning and said lock washer may be removed from the counterbore when said screw is removed from the threadably tapped hole.

3. For use with a threadably tapped hole having a concentric cylindrical counterbore, the combination of a screw and a malleable lock washer, said screw having a threaded portion adapted to be threadably inserted within the tapped hole, a head portion and a shank portion, said shank portion being of substantially uniform thickness and having a diameter which is at least as great as the diameter of said threaded portion and which is smaller than the diameter of said head portion, said shank portion having a radial projection extending outwardly therefrom, said lock washer being of sinuous axial cross section and being capable of axial compression and radial broadening in response to axial pressure to substantially fill the counterbore circumjacent the screw shank portion, the smallest radial dimension of said washer uncompressed being of greater magnitude than the radial dimension of said projection and of smaller magnitude than the radial dimension of said head portion, said radial projection being adapted to engage the lock washer when the latter is compressed whereby said screw and said washer are prevented from subsequent axial movement relative to each other.

4. For use with a threadably tapped hole having a concentric cylindrical counterbore, the combination of a screw and a sleeve-like malleable lock washer, said screw having a threaded portion, a cylindrical head portion, and a cylindrical shank portion intermediate said threaded portion and said head portion, said shank portion having a diameter which is greater than the diameter of said threaded portion and which is uniformly smaller than the diameter of said head portion, a cylindrical shoulder-like projection extending radially outward from said shank portion adjacent said threaded portion, said washer having at least one annular groove in each of its cylindrical surfaces and adapted to be axially compressed to a length approximately equal to the shank portion of said screw and to be radially broadened into contact with the shank portion, substantially filling the counterbore circumjacent said shank portion, the smallest inside diameter of said washer being of greater magnitude than the diameter of said cylindrical projection and being of smaller magnitude than the diameter of said head portion, said cylindrical projection extending outwardly to engage the compressed washer to effect removal of said washer from the cylindrical counterbore when the screw is removed from the threadably tapped hole.

References Cited in the file of this patent

UNITED STATES PATENTS

| | | |
|---|---|---|
| 873,424 | Greene | Dec. 10, 1907 |
| 1,320,622 | Kennedy | Nov. 4, 1919 |
| 1,373,640 | Taylor | Apr. 5, 1921 |
| 1,840,312 | Dunmire | Jan. 12, 1932 |
| 2,371,463 | Olson | Mar. 13, 1945 |